… = …

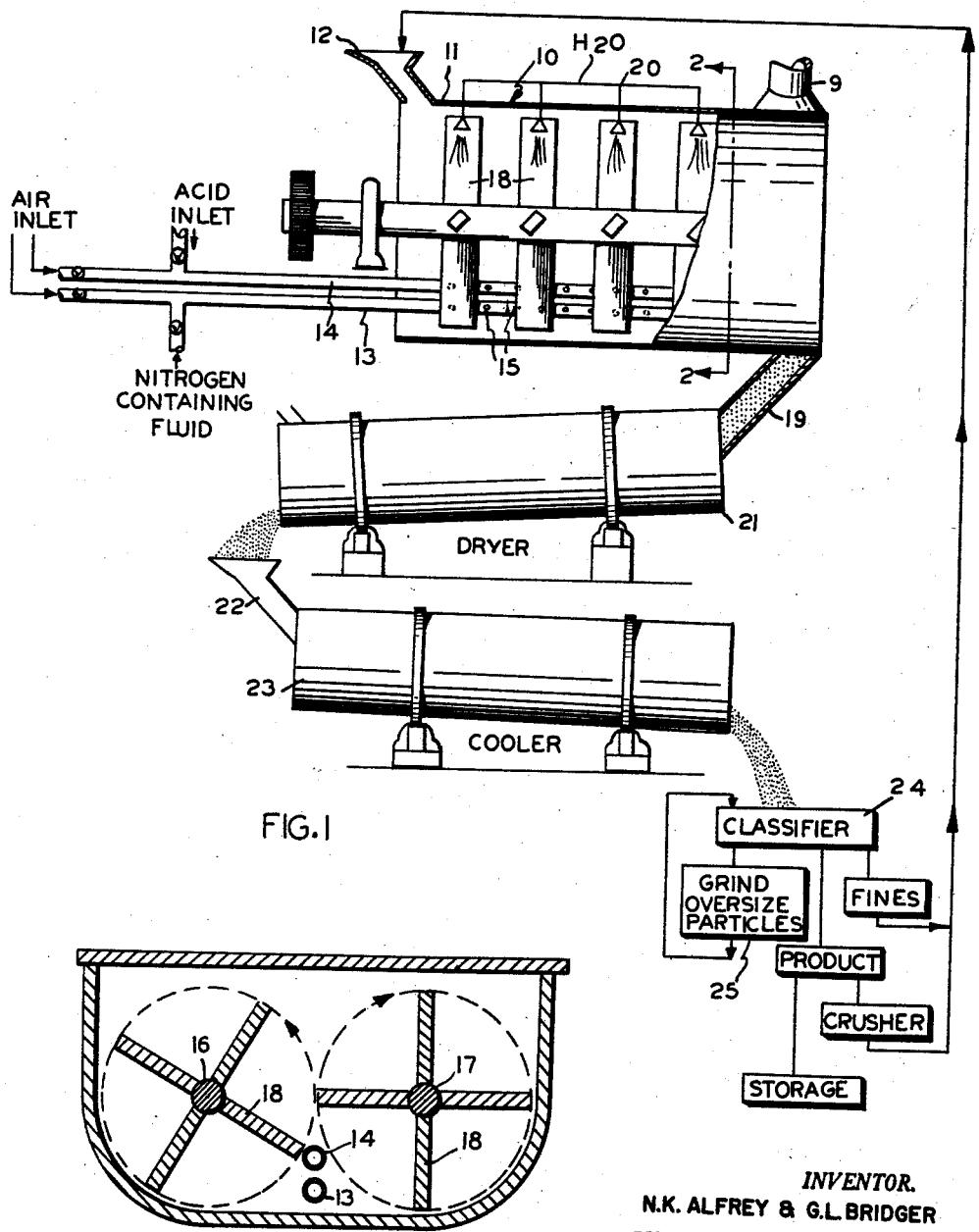

United States Patent Office 3,125,435
Patented Mar. 17, 1964

3,125,435
FERTILIZER MANUFACTURE
Norval K. Alfrey and Grover L. Bridger, Baltimore, Md., assignors to W. R. Grace & Co., New York, N.Y., a corporation of Connecticut
Filed July 29, 1960, Ser. No. 46,152
2 Claims. (Cl. 71—64)

This invention relates to the manufacture of fertilizers by a continuous process. In one particular aspect, it is a process wherein ammonium salts of liquid acids and nitrogen-containing fluids are formed, and wherein the reaction heat evolved serves to vaporize diluent liquids such as water.

Fertilizers usually contain one, but more often, two or all three of the main elements which are needed for growing crops, i.e. nitrogen, phosphorus, and potassium. A mixture containing all three elements in the desired proportions is said to be a complete fertilizer and it is common practice to speak of such compositions in terms of percentages of N, $P_2O_5$, and $K_2O$ in forms available to growing crops and expressed in that order. For example, a formula such as 5–10–5 refers to a mixture containing 5% N, 10% $P_2O_5$ and 5% $K_2O$.

Demand for two of the elements, nitrogen and phosphorus, has increased sharply in recent years. These elements are supplied in the form of concentrated ammonium phosphates. To produce grades such as 16–48–0 and 18–46–0, having a total of 64 percent plant food, large amounts of raw materials, phosphoric acid and ammonia are needed. The advantage of such concentrated materials in respect to shipping, packaging, and handling costs renders them competitive with ordinary fertilizer even though the production costs of ordinary fertilizer may be less.

The reaction between phosphoric acid and ammonia yields monoammonium phosphate, or diammonium phosphate, or both, depending on the relative proportions of phosphoric acid and ammonia introduced, according to the following equations:

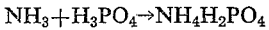

$$NH_3 + H_3PO_4 \rightarrow NH_4H_2PO_4$$

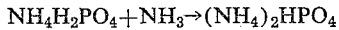

$$NH_4H_2PO_4 + NH_3 \rightarrow (NH_4)_2HPO_4$$

In most conventional processes, the reaction is carried out in large tanks. There results a hot slurry, which is subsequently discharged into a granulator, and there is combined with sufficient previously manufactured dry, granulated product, which absorbs the water. Suitable agitation controls agglomeration and assures that the damp material is in a granulated form. It is then further dried, cooled and classified and a large portion is recycled to the granulator. In most conventional processes the recycle requirement is high, up to 12 or 15 tons of recycle per ton being produced. As a result either the production rate must be prohibitively low or the equipment must be of large capacity.

It is, therefore, an object of this invention to provide a continuous process for economically and efficiently decreasing recycle requirements for ammonium salts, thus producing a greater product yield for a given size of equipment than methods heretofore employed.

It is another object of this invention to simplify manufacturing procedures by utilizing the heat evolved in reacting the acid and nitrogen-containing fluid to evaporate the solution water and give a substantially dry, granular fertilizer directly as a reaction product.

A further object of this invention is to provide a continuous process for producing a granular fertilizer of optimum particle size.

Broadly, the process comprises charging a mass of particulate solid material into one end of an elongated mixing zone and injecting streams of nitrogen-containing fluid and acid into the mass as it is mixed and tumbled through the mixing zone to the discharge end. In the mixing zone the particles of feed material are coated with a thin layer of the acid which is immediately neutralized by the nitrogen-containing fluid. The heat of neutralization vaporizes most of the moisture from the reacted coating and substantially dry built-up granules of fertilizer are withdrawn from the mixing zone. In addition, the reaction produces new particles of fertilizer material.

By "nitrogen-containing fluid" is meant aqueous ammonia, anhydrous liquid or anhydrous gaseous ammonia and nitrogen solutions, alone or mixtures thereof. Nitrogen solution refers to solutions of ammonia and other compounds of nitrogen such as ammonium nitrate or urea or both in water. These solutions may be obtained commercially.

By "acid solution" is meant phosphoric, sulfuric or nitric acid, as well as mixtures of these acids.

It is also within the concept of this invention to use chemically dissimilar solid feed material as nuclei particles for the ammonium salts. For example, a deposit of an ammonium salt can be built-up on the surface of a phosphatic material such as superphosphate.

In carrying out the process, reference is made to the drawing in which:

FIG. 1 represents a schematic flow sheet and side view of apparatus partly in section for carrying out the process of the present invention.

FIG. 2 is a cross-sectional view of the mixer 10 taken on the line 2—2.

Referring now to the drawings, solid ingredients are introduced through feed hopper 12 into one end of a mixer 10 such as a twin shaft pug mill having a removable lid 11. Two horizontal distributor conduits 13 and 14 are positioned centrally along the bottom of mixer 10 and extend longitudinally along a substantial portion of its length. These conduits are provided along each side with a plurality of spaced side openings 15 for discharging streams of solution in the direction of the side walls of mixer 10. Each opening in the upper conduit is preferably located coincident with one in the lower conduit.

Mounted generally centrally in each half of mixer 10 are shafts 16 and 17 which bear a plurality of spaced radial blades 18 of sufficient length to provide only a small blades 18 of sufficient length to provide only a small clearance between their tips and the walls of the mixer to permit clean sweeping of the material during operation and thereby prevent build-up and caking. The blades are set at a downstream thrust sufficient for brisk conveying of the solids through the mixer toward discharge chute 19.

In carrying out the process for preparing the granulated ammonium phosphate, air under pressure is passed through conduits 13 and 14 to clear any material plugging openings 15. After a short period the air flow is stopped, the mixer is put into operation and previously manufactured material consisting of finely divided ammonium phosphate is introduced into the mixer through feed hopper 12. The radial blades are counterrotated upwardly from the center of the mixing chamber to maintain a bed of material on the floor of the mixer. The bed functions as a seal above the distributor conduits and is kept no deeper than necessary for efficient ammoniation.

Ammonia, either liquid, gaseous, or solution, is passed through lower conduit 13 and phosphoric acid is passed through upper conduit 14, both liquids issuing from the openings 15 in a plurality of streams in contact with the surrounding solid material. The tumbling recycling granules are coated with a thin layer of the acid directly in the mixer and immediately the acid is neutralized by the ammonia to precipitate more ammonium phosphate in situ on the surface of the particles of ammonium phosphate. The reaction also may form new particles of ammonium phosphate. The radial blades swiftly move the admixed solid material toward the discharge end of the mixer while cutting and mixing it in transit.

The acid-ammonia neutralization reaction is highly exothermic. Much of the heat is absorbed by the solution water of the acid and ammonia but additional water may be required to maintain desired temperatures of the reactants. Water as needed, especially when using concentrated reactants, may be added to the pug mixer 10 as a misting shower spray as at 20 on top of the bed of solids.

Upon contact with the hot granule surfaces, the misting shower spray is instantly converted to steam thereby cooling the granules. The steam is continuously swept into the exhaust stream 9. Rate of addition must be controlled to prevent localized overwetting which may occur when the water mist is retained on the cooled granule surfaces.

The granular solid product is discharged from mixer 10 through chute 19 into the feed end of an inclined rotary drier 21 where it is brought into contact with heated gases. The dried granular product is passed from the lower end of the drier 21 through chute 22 into an inclined rotary cooler 23 where it is cooled by means of air. The flow of material through the cooler is effected by rotation of the inclined apparatus. The cooled product is discharged into classifier 24. The oversize particles are delivered to a grinding mill 25 for particle size reduction and then reclassified. Fines are recycled to the feed hopper 12 of mixer 10. Part of the product may also be recycled to the feed hopper 12.

It was found that four factors influence the rate of recycle required. These factors are in order of decreasing importance: (1) Uniformity of the rate of liquids introduction into the mixer; (2) temperature of the material in the mixer; (3) agitation of the material in the mixer; and (4) particle size (screen analysis) of the recycle material. In general, the ratio of recycled solids to fresh reactants will be in the range of 1.5:1.0 to 2.5:1.0.

Regardless of production rate and material temperature, localized excessive acid flow without ammonia for neutralization caused the recycle requirement to increase 2 to 3 fold. A uniform regulated flow of acids and ammonia is essential to low recycle requirement.

The effect of temperature of the material in the mixer is illustrated by the following data obtained in the production of ammonium phosphate from anhydrous liquid ammonia and wet process phosphoric acid.

| Material temp., ° F.: | Maximum required recycle ratio[1] |
|---|---|
| 155–205 | 5.5:1 |
| 205–230 | 2.5:1 |

[1] The recycle ratio is expressed in terms of weight of recycle per one weight unit of product.

The maximum amount of material needed to be recycled is at temperatures slightly below the boiling point of the reactants. Optimum temperature is that at which the reactants boil.

Churning deep masses of the material in the pug mixer is undesirable because it increases agglomeration and thus increases the recycle requirement. Quick conveyance of the material through the mixer by active agitation, however, prevents agglomeration of the granules and thereby lowers the recycle requirement. Active agitation also helps to assure a uniform layering of reactants on the granule surfaces.

The following table is illustrative of the importance of particle size to the recycle requirement.

| Recycle Material | | Required Recycle Ratio |
|---|---|---|
| Type | Screen Analysis | |
| Normal recycle —6 mesh product plus crushed oversize and undersize. | 70% —6+20 Mesh<br>30% —20 Mesh | 1.2:1 |
| Fine recycle | 45% —6+20 Mesh<br>25% —20+60 Mesh<br>30% —60 Mesh | 0.5:1 |
| Coarse recycle | 99% —6+10 Mesh | 3.0:1 |

No difference was noted in recycle requirements when using either wet process phosphoric acid or electric furnace phosphoric acid of the same concentration.

Rate of water usage was found to be important only after it cooled the mass sufficiently to decrease water vaporization. Calculations show that up to 500 pounds of water per ton of material being produced may be needed in plant operation to control the temperature of the material in the mixer. Adding up to 100 pounds of water spray onto the top of the mixing zone and adding one-half of the remainder through the acid conduit while introducing the residue through the ammonia conduit was found to be the optimum method for supplying the water needed to control the temperature of the material in the pug mixer. It was desirable to provide means for controlling the addition rate of the water at each location. At material temperatures maintained at 212° F. or above, the water usage rate had almost negligible effect on visible material wetness or recycle requirement.

The present invention will be further illustrated by the following examples.

EXAMPLE I

The process described above was developed through an extensive series of pilot plant tests. The equipment used was similar to that illustrated in FIGURES 1 and 2. The blades were set at approximately a 45° angle to their respective shafts for rapid conveyance of the solid material through the mixer. The shaft speed was set at approximately 83 r.p.m. and the solid material was retained in the mixer about 1 to 1½ minutes. Fine particle size previously manufactured ammonium phosphate material of the same formula as that to be prepared, 16–48–0 or 18–46–0, was fed into the mixer. When a bed of ammonium phosphate over the distributor conduits was established, a mixture of wet process phosphoric acid and sulfuric acid was introduced into the mixer through the acid conduit and anhydrous liquid ammonia was introduced through the nitrogen-solution conduit. The amount of water added to maintain the temperatures between 200 and 230° F. was approximately equivalent to 500 pounds of water per ton of material being produced. An equivalent of about 100 pounds of water was sprayed onto the top of the mixing zone and the remainder was introduced through the distributor conduits in acid and ammonia solution.

Table I shows the formulations which were used in the test operations. The overformulation of phosphorus pentoxide is for the purpose of compensating for test operating fluctuations and would not be required in a standard formula. The overformulation of nitrogen could probably be reduced in standard practices. The required ratio of recycled solids to fresh reactants was in the range of 1.5:1.0 to 2.5:1.0.

Table I
FORMULATIONS USED IN EXPERIMENTAL WORK

| Raw Material | Analysis | 16-48-0 | | | 18-46-0 | | |
|---|---|---|---|---|---|---|---|
| | | Pounds/Ton | | Units, Plant Food | Pounds/Ton | | Units, Plant Food |
| | | Actual | Dry | | Actual | Dry | |
| Phosphoric Acid | 52% $P_2O_5$ | 1,885 | 1,431 | 49($P_2O_5$) | 1,785 | 1,355 | 46.4($P_2O_5$). |
| Anhydrous Ammonia | 82.25% N | 415 | 415 | 17(N) | 450 | 450 | 18.5(N). |
| Sulfuric Acid (60° Be.) | 77.67% $H_2SO_4$ | 218 | 169 | | 258 | 200 | |
| Moisture | | | 10 | | | 10 | |
| Total Pounds/Ton | | 2,518 | 2,025 | | 2,493 | 2,015 | |
| Ammonia Loss | | | 25 | | | 15 | |
| Total Evap. Allowance | | 518 | | | 493 | | |
| Pounds/Ton of Product | | 2,000 | 2,000 | | 2,000 | 2,000 | |
| Ammoniation | | $\frac{H_2SO_4}{2.88}$=Lbs. $NH_3$ | | | $\frac{H_2SO_4}{2.88}$=Lbs. $NH_3$ | | |
| | | $\frac{H_3PO_4}{3.84}$=Lbs. $NH_3$ | | | $\frac{H_3PO_4}{3.3}$=Lbs. $NH_3$ | | |
| | | (1.5 Mols. $NH_3$/Mol. $H_3PO_4$) | | | (1.74 Mols. $NH_3$:1.0 Mol. $H_3PO_4$) | | |

Table II shows representative chemical and screen analyses for 16-48-0 and 18-46-0 produced in the tests. The analyses in general are satisfactory. Approximately 10 percent excess ammonia was used for the 18-46-0 production. The moisture analyses shown are total losses after 5 hours drying at 100° C. and include an undetermined amount of ammonia. Vacuum desiccator analyses would show the free moisture content more accurately.

Table II
REPRESENTATIVE CHEMICAL AND SCREEN ANALYSES OF THE PRODUCTS

| Chemical Analyses | 16-48-0 | 18-46-0 | 18-46-0 [1] |
|---|---|---|---|
| N | 16.40 | 18.50 | 19.80 |
| Total $P_2O_5$ | 51.00 | 49.90 | 44.60 |
| Insol. $P_2O_5$ | 0.00 | 0.00 | 0.04 |
| Avail. $P_2O_5$ | 51.00 | 49.90 | 44.56 |
| Water Sol. $P_2O_5$ | 50.10 | 48.80 | 43.50 |
| Moisture | 3.80 | 3.68 | 4.26 |

| Ro-tap Screen Analyses—U.S. Sieves | 16-48-0 | | | 18-46-0 | |
|---|---|---|---|---|---|
| | Recycle Material,[2] Percent | Unclassified Product, Percent | -6 Mesh Product,[3] Percent | Unclassified Product, Percent | -6 Mesh Product,[3] Percent |
| +4 Mesh | 0.07 | 5.9 | 0.0 | 0.0 | 0.0 |
| -4+6 Mesh | 0.07 | 9.0 | 0.0 | 0.0 | 0.0 |
| -6+10 Mesh | 53.1 | 65.2 | 45.0 | 48.1 | 45.4 |
| -10+20 Mesh | 19.0 | 16.3 | 51.3 | 48.9 | 53.1 |
| -20+30 Mesh | 5.1 | 1.3 | 2.7 | 2.5 | 1.5 |
| -30 Mesh | 22.8 | 2.3 | 1.0 | 0.5 | 0.0 |

[1] These analyses are from a brief test run made to indicate the maximum feasible uptake of ammonia.
[2] Includes crushed oversize material.
[3] No undersize screen panel was used.

We claim:

1. A continuous process for producing substantially dry granular fertilizer grade ammonium salts by reacting ammonia with at least one strong mineral acid selected from the group consisting of sulfuric acid and phosphoric acid which process comprises continuously charging a mass of undersized finely divided solid particulate ammonium salt of said mineral acid into one end of an elongated mixing zone to form a bed of solids, continuously stirring said mass with a cutting and mixing action and simultaneously advancing said mass swiftly to the discharge end of the bed, continuously passing ammonia and said mineral acid into the lower portion of said bed of solids along a substantial portion of its length, said ammonia and said mineral acid being passed at a mole ratio corresponding stoichiometrically to the composition of the ammonium salt charged, said mineral acid thereby coating the particles of said ammonium salt constituting said bed, said ammonia immediately reacting with said mineral acid coating to form a coating of additional ammonium salt around said particles, said coatings having substantially the same composition as said particles, thereby yielding larger granules of the said ammonium salt with the simultaneous evaporation of water, maintaining said bed over said incoming ammonia and incoming mineral acid to serve as a seal for the said reaction, discharging the thus evaporated water from above the mixing zone, continuously withdrawing the substantially dry particulate material from said zone, classifying said material into product and undersized material, and returning the undersized material to the said end of said zone for another pass therethrough.

2. A process according to claim 1 in which the strong mineral acid is phosphoric acid.

References Cited in the file of this patent
UNITED STATES PATENTS

| | | |
|---|---|---|
| 2,600,253 | Lutz | June 10, 1952 |
| 2,945,747 | Nielsson | July 19, 1960 |
| 2,946,666 | Eymann | July 26, 1960 |
| 2,963,359 | Moore et al. | Dec. 6, 1960 |
| 2,965,472 | Huxley et al. | Dec. 20, 1960 |
| 3,041,157 | Crane et al. | June 26, 1962 |